A. HAWKINS-MASTERS.
WHEEL FOR VEHICLES.
APPLICATION FILED NOV. 18, 1911.

1,039,772.

Patented Oct. 1, 1912.

WITNESSES

INVENTOR
A. Hawkins-Masters.

UNITED STATES PATENT OFFICE.

ARTHUR HAWKINS-MASTERS, OF LONDON, ONTARIO, CANADA.

WHEEL FOR VEHICLES.

1,039,772.   Specification of Letters Patent.   Patented Oct. 1, 1912.

Application filed November 18, 1911. Serial No. 661,159.

*To all whom it may concern:*

Be it known that I, ARTHUR HAWKINS-MASTERS, of the city of London, in the county of Middlesex, in the Province of Ontario, Canada, have invented certain new and useful Improvements in Wheels for Vehicles, of which the following is the specification.

My invention relates to improvements in wheels for vehicles, and the object of the invention is to devise a wheel particularly adaptable for automobiles, motor trucks and other like vehicles, which will obviate the necessity of using a pneumatic tire and yet provide a resiliency equal to, if not greater, than that of the ordinary pneumatic tire, so that the jar and strain on the body of the car and running gear will be relieved to a great extent, and practically reduced to a minimum.

A further object is to make the wheel of such a construction that the side sway of the body of the car, when it occurs, will be taken up in the wheel itself and thereby reduce the liability if not altogether do away with the skidding of the wheel on wet or slippery pavements or roads.

My invention consists of a felly or rim provided with a tire preferably of rubber of any suitable type commonly known as a solid rubber tire, a divided hub made in three portions, a central and two outer portions, and a series of spokes having the outer ends secured to the rim and the inner ends bolted between the central and outer portions of the hub, the spokes themselves having a central semi-circular bend one half of the spokes having the bend turned outwardly toward one face of the wheel and the other half having the bend turned reversely or outwardly toward the opposite face of the wheel, the parts being otherwise constructed and arranged as hereinafter more particularly explained.

Figure 1:
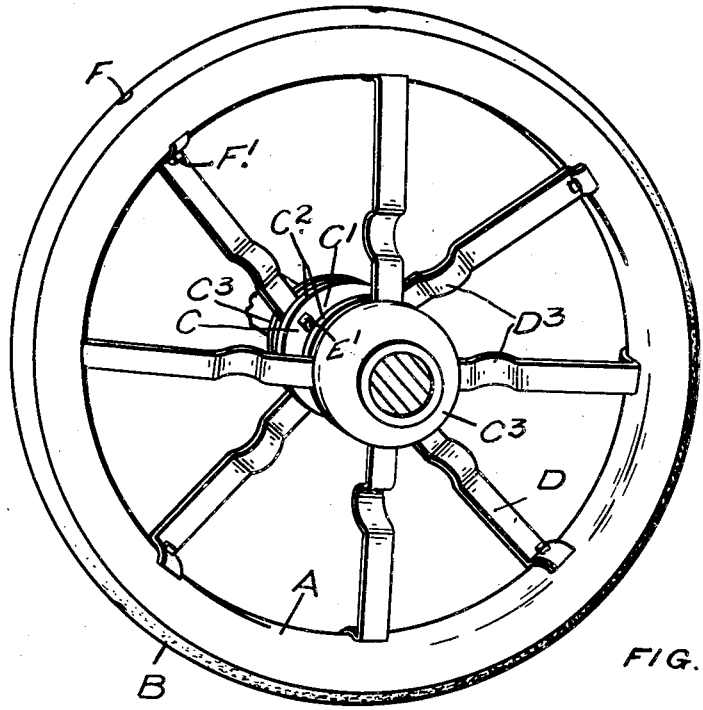
Figure 2:
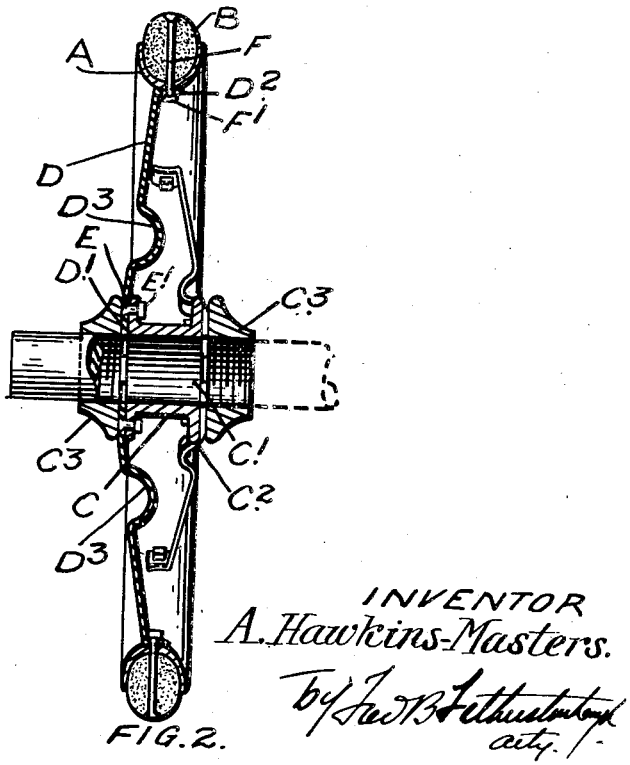

Figure 1, is a perspective view of a vehicle wheel constructed in accordance with my invention. Fig. 2, is a vertical section.

In the drawings like letters of reference indicate corresponding parts in each figure.

A is the rim of the wheel, which may be of wood or metal and B is the solid rubber tire of any suitable type, which fits into the channel formed in the periphery of the wheel A.

C is the hub, which is made of three portions consisting of a central portion $C'$ having annular flanges $C^2$ and the outer portions $C^3$ of an annular flange-like form.

D are the spokes, which are for the major portion straight but have the inner ends $D'$ slightly bent and provided with holes through which extend the bolts E provided with suitable nuts $E'$ at the inner end. The spokes are of spring metal. The outer ends of the spokes D are provided with flanges $D^2$ through which extend the bolts F, such bolts extending through the rim A and tire B, the nuts $F'$ being preferably on the inner ends of the bolts. The heads of the bolts would be necessarily reduced in the outer periphery of the tire even more if necessary than is shown in the drawing. The spokes D are obliquely set in relation to a plane passing through the center of the wheel parallel to its faces and are provided with substantially semi-circular or arc-shaped bends $D^3$ which form not only means for giving resiliency to the wheel under load but also providing for a lateral resiliency to the central portion of the wheel or hub in relation to the rim. The spokes are alternately arranged, so that the semi-circular bends $D^3$ are arranged one reverse to the other, that is the spokes inclined inwardly from the hub to the rim, the alternate spokes inclining inwardly from the opposite sides of the hub and having the recessed side of the bend outermost. In this way I provide means whereby the normal tendency of the hub of the wheel is to lie normally centrally within the rim. The axle of the vehicle, of course, being held in the hub and connected to the running gear will by my construction be permitted to sway with the vehicle when it sways without imparting any appreciable sway to the rim and tire. Thus I am enabled to eliminate to a maximum extent any tendency of the tire of the wheel skidding on a wet or slippery pavement or road. The tendency to skid is removed for the reason that the sway is permitted centrally within the wheel and not to the tire as it would be were the wheel rigid laterally on its axle.

Such a wheel as I describe is, it will be seen, a cheap wheel to make as it is very simple and I find in practice will give excellent results both as to giving resiliency and a cushioning effect for the body of the car and preventing skidding of the car.

What I claim as my invention is:

In a wheel the combination with the rim provided with a suitable tire and the hub, of spokes formed of straight spring material extending between the rim and the hub, said spokes being alternately arranged so that each alternate spoke from the opposite end of the hub extends obliquely inwardly in a straight line to the rim, said spokes having a semi-circular bend intermediate the ends thereof, the bend in each alternate spoke being oppositely curved and the inner face of said curved portions extending to a point in a plane drawn through the median line of said rim.

ARTHUR HAWKINS-MASTERS.

Witnesses:
 B. BOYD,
 H. PRESTON.